(12) United States Patent
Blair et al.

(10) Patent No.: US 8,267,498 B1
(45) Date of Patent: Sep. 18, 2012

(54) METHODS, APPARATUS AND ARTICLES OF MANUFACTURE TO CONTROL GLOSS QUALITY

(75) Inventors: Dustin W. Blair, Escondido, CA (US);
Brian E. Curcio, San Diego, CA (US);
David S. Vejtasa, Rancho Bernardo, CA (US); Glenn Thomas Haddick, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 12/791,648

(22) Filed: Jun. 1, 2010

(51) Int. Cl.
*B41J 29/38* (2006.01)
(52) U.S. Cl. .......................................... 347/19
(58) Field of Classification Search .............. 347/14, 347/15, 19
See application file for complete search history.

(56) References Cited

U.S. PATENT DOCUMENTS

| | | | |
|---|---|---|---|
| 7,239,816 B2 | 7/2007 | Ng | |
| 7,283,762 B2 | 10/2007 | Roof | |
| 7,412,180 B2 | 8/2008 | Roof | |
| 2005/0135823 A1 | 6/2005 | Ng | |
| 2006/0115288 A1 | 6/2006 | Roof | |
| 2009/0196641 A1 | 8/2009 | Banton et al. | |

OTHER PUBLICATIONS

Takemoto et al., "High-Gloss and Wide Color Gamut Pigmented Inks for Ink-Jet printing," proceedings of IS&T19: International Conference on Digital Printing Technologies, Sep. 28-Oct. 3, 2003 (5 pages).

*Primary Examiner* — An Do (57) ABSTRACT

Example methods, apparatus and articles of manufacture to control gloss quality in printed images are disclosed. A disclosed example apparatus includes a print engine to print a plurality of images for respective ones of a plurality of colors, each image representing a plurality of different print parameter combinations, a scan module to measure a first plurality of light reflectances for respective ones of the plurality of images and the print parameter combinations, and a calibrator to calibrate an operation of the print engine for respective ones of the plurality of colors based on the first plurality of measured light reflectances, the operations of the print engine including at least one of an order of ink application, a rate of ink application, a density of ink application, or an applied amount of gloss enhancer.

15 Claims, 7 Drawing Sheets

METHODS, APPARATUS AND ARTICLES OF MANUFACTURE TO CONTROL GLOSS QUALITY

BACKGROUND

Multiple factors affect how persons perceive the quality of a printed image such as a photograph. Example factors include, but are not limited to, media type, ink type, resolution, color accuracy and gloss quality (e.g., shininess, glossiness and/or consistency of glossiness). While gloss quality may be objectively measured it may also be subjective in that different persons may perceive the glossiness of a printed image differently.

DETAILED DESCRIPTION

People are increasingly concerned with the gloss quality of printed images such as photographs, color documents, etc. However, the gloss quality of printed images is generally dependent on multiple, inter-related and possibly conflicting variables. Example print parameters and/or variables that may affect gloss quality of a printed image include, but are not limited to, media characteristics (e.g., media type, ink absorption rate, glossiness of the media, texture of the media, etc.), ink type, number of inks, ink flux (e.g., the rate at which ink is applied), ink density (e.g., the amount of ink that is applied), and/or application of gloss enhancer (GE). Images may also be printed using multiple passes. As such, it may take a research and development team many years to achieve a desired gloss quality (e.g., highest gloss, best gloss consistency, best perceived gloss, most cost effective, etc.) for a specific combination of ink type and media type. Unfortunately, the processes used to manufacture the ink and/or the print media may change over time and, thus, a previously optimized gloss quality may no longer represent the best gloss quality that can be achieved. Moreover, gloss quality may vary over time due to, for example, temperature, ambient light, media type, media age, ink age, storage conditions, changes in personal preferences, etc.

Example methods, apparatus and articles of manufacture to control gloss quality of printed images are disclosed. In disclosed examples, the gloss qualities of a set of printed test images and/or tiles are measured and used to calibrate and/or select print parameters and/or variables used to print images. By using closed-loop gloss quality calibration processes, the gloss quality for any particular combination of ink type, media type, ambient conditions, user preferences, etc. can be controlled, adjusted, selected, and/or optimized. The example gloss quality calibration processes described herein may be carried out and/or initiated by a user of the example printers described herein. In other words, the user may, prior to printing images, initiate gloss quality calibration to improve, control and/or manage the gloss quality of the printed images. In some examples, gloss quality calibration is performed when the printer is installed and/or configured, is performed periodically (e.g., once a week, after a certain number or printed images, etc.) or aperiodically (e.g., when the user notices a change or degradation in gloss quality, when a new batch of media is received from a manufacturer, when a new batch of ink is received from a manufacturer, when media type or ink type is changed, etc.), and/or prior to initiating a large printing job for which gloss quality and/or gloss consistency is important. Additionally or alternatively, the example gloss quality calibration processes described herein may be performed during manufacturing or product test.

A disclosed example apparatus includes a print engine to print a plurality of images for respective ones of a plurality of colors, each image representing a plurality of different print parameter combinations, a scan module to measure a first plurality of light reflectances for respective ones of the plurality of images and the print parameter combinations, and a calibrator to calibrate an operation of the print engine for respective ones of the plurality of colors based on the first plurality of measured light reflectances, the operations of the print engine including at least one of an order of ink application, a rate of ink application, a density of ink application, or an applied amount of gloss enhancer.

A disclosed example method includes printing a plurality of images for respective ones of a plurality of colors, each image representing a plurality of different print parameter combinations, measuring a first plurality of light reflectances for respective ones of the colors and the print parameter combinations, and calibrating an operation of a print engine for respective ones of the colors based on the first plurality of measured light reflectances, the operation of the print engine including at least one of an order of ink application, a rate of ink application, a density of ink application, or an applied amount of gloss enhancer.

An example tangible article of manufacture storing machine-readable instructions is the disclosed. The machine-readable instructions, when executed, causing a machine to control gloss quality by printing a plurality of subimages for respective ones of a plurality of colors, the subimages including a plurality of portions for respective ones of a plurality of print parameter combinations, measuring a first plurality of light reflectances for respective ones of the plurality of portions, and calibrating a plurality of operations of a print engine for respective ones of the plurality of colors based on the first plurality of measured light reflectances, the operations of the print engine including at least one of an order of ink application, a rate of ink application, a density of ink application, or an applied amount of gloss enhancer.

Figure 1:
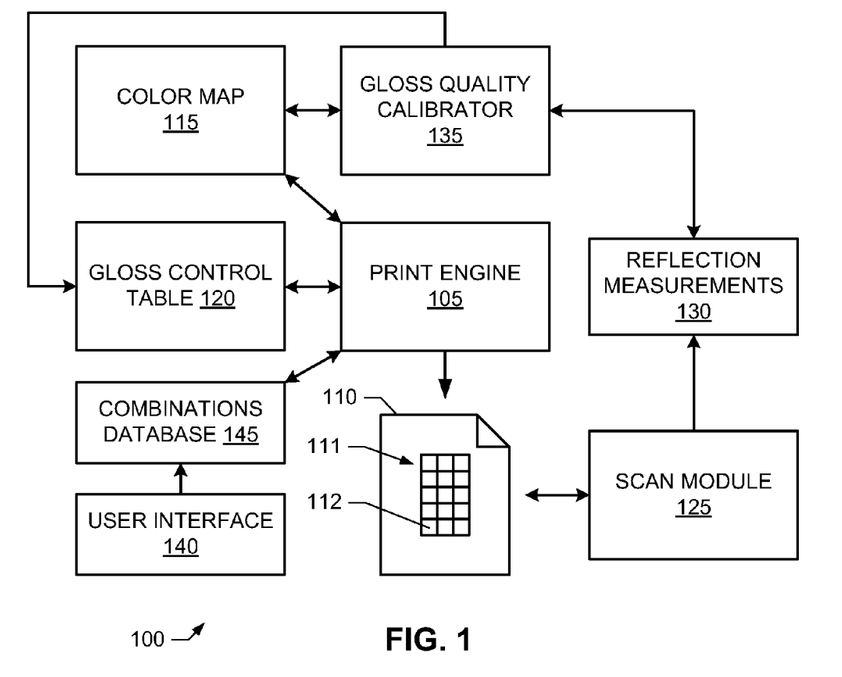
FIG. 1 is a schematic illustration of an example printer that is structured to control gloss quality.

FIG. 1 illustrates an example printer 100 which is structured to control, select, manage, adjust and/or optimize the gloss quality of printed images. To print images, the example printer 100 of FIG. 1 includes a print engine 105. Using any number and/or type(s) of ink supplies and/or ink cartridges (not shown) and using any of number printing passes (e.g., six), the example print engine 105 of FIG. 1 prints images on print media 110. The example print media 110 may be any type of media suitable for printing by the example printer 100. The printing process(es) implemented by the example print engine 105 are controlled, adjusted and/or managed by a color map 115 and a gloss control table 120. An example process that may be implemented by the example print engine 105 of FIG. 1 to control gloss quality is described below in connection with FIG. 10. Example data structures that may be used to implement the gloss control table 120 and/or a combined color map and gloss control table are described below in connection with FIGS. 5, 7 and 8.

Color information may be stored in the example color map 115 using any number and/or type(s) of data structure(s). For example, the color map 115 could include an entry (e.g., a row of a table) for each possible color, with each entry identified by its corresponding RGB triplet. Example entries include a plurality of units of ink (e.g., drops, picoliters, etc.) for respective ink colors. To print a particular color, the print engine 105 queries the color map 115 using the RGB triplet associated with the color to obtain the quantities of each color of ink to apply. As described below in connection with FIG. 10, the identified quantities of ink can be applied in one or more print passes, as specified and/or controlled via the gloss control table 120, to control the gloss quality of the resultant image(s). The example color map 115 of FIG. 1 may be stored in any number and/or type(s) of volatile and/or non-volatile memory(-ies), memory device(s) and/or storage device(s).

To enable calibration, control, measurement, estimation and/or determination of gloss quality, the example print engine 105 of FIG. 1 prints a gloss quality control test image 111 on the media 110. The example gloss quality control test image 111 of FIG. 1 includes one or more sub-images 112, with each of the sub-images 112 corresponding to a particular test color. In some examples, the print engine 105 prints sub-images 112 for a representative subset of all the possible colors that can be printed by the printer 100 (i.e., the printer's gamut). The subset of colors may be determined when the printer 100 is designed, manufactured, installed and/or upgraded, may be dynamically selected by a gloss quality calibrator 135, and/or may be selected by a user via a user interface 140. While the example gloss quality control test image 111 of FIG. 1 is a rectangular array of sub-images 112, other test image patterns may be used. For example, a test image 111 may include one or more spaced-apart columns of sub-images 112, and/or the sub-images 112 may be arranged in other patterns such as a circle, a hexagon, a square, or a triangle.

Figure 2:
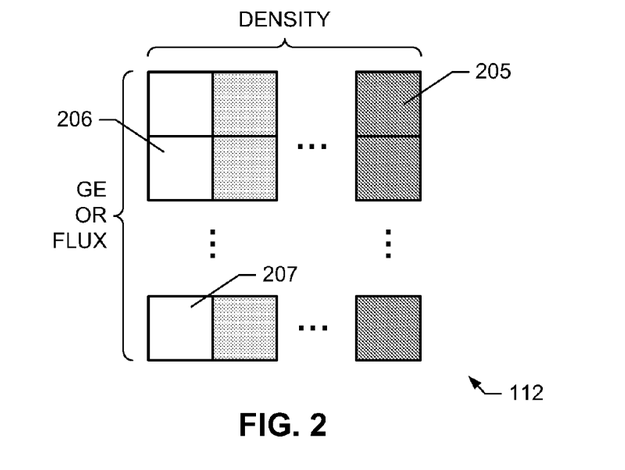
FIG. 2 illustrates an example gloss quality control test pattern.

FIG. 2 illustrates an example gloss quality control test pattern that may be used to implement the example test sub-image 112 of FIG. 1 for a particular color such as red, which may be expressed using RGB notation as (255, 0, 0). As shown in FIG. 2, each sub-image 112 includes a plurality of tiles, patches, splotches, areas, blocks and/or portions, three of which are designated at reference numerals 205, 206 and 207. Each sub-image 112 corresponds to a respective print parameter combination 145. In other words, the different portions 205-207 correspond to different combinations of print parameters. Example print parameters include, but are not limited to, ink density, ink flux, ink order and/or an amount of GE. In FIG. 2, the example portion 205 corresponds to a higher ink density than that associated with portion 206. The example portion 207 corresponds to a larger amount of applied GE and/or larger ink flux than portion 206. It should be appreciated that any number of print parameter combinations could be included in the example sub-image 112. In practice, the number of print parameter combinations will be selected to not use unacceptable quantities and/or combinations of ink or GE, and/or to not require an unacceptable amount of time to print and/or analyze. The print parameter combinations may be determined when the printer 100 is designed, manufactured, installed and/or upgraded and stored in the example combinations data structure 145, may be dynamically selected by the example gloss quality calibrator 135, and/or may be selected by a user via the example user interface 140. For example, a user of the example printer 100 may select and/or identify via the user interface 140 the thoroughness of gloss quality analysis (e.g., high, medium or low) to be carried out and, thus, the number of portions 205-207 and/or the number of sub-images 112 to be printed and analyzed. While the example sub-image 112 of FIG. 2 is a rectangular array of rectangular (e.g., square) areas 205-207, other sub-image patterns may be used. For example, the sub-image 112 may include one or more spaced-apart columns of rectangular, hexagonal, circular, oval and/or irregular portions 205-207, and/or the portions 205-207 may be arranged in other patterns such as a circle, a square, a hexagon, or a triangle.

Returning to FIG. 1, print parameter combinations may be stored in the example print parameter combinations database 145 using any number and/or type(s) of data structure(s). For example, the combinations database 145 could include an entry (e.g., a row of a table) for each combination to be tested. Each entry includes a plurality of values for respective ones of print parameters. An example entry of (300, 0, and 100/6%) corresponds to an ink density of 300 units of ink (e.g., drops, picoliters, etc.), no GE, and an ink flux rate of 100/6=16.7% of the total 300 units of ink applied during each of six print passes. The example print parameters combinations database 145 of FIG. 1 may be stored in any number and/or type(s) of volatile and/or non-volatile memory(-ies), memory device(s) and/or storage device(s).

Figure 3:
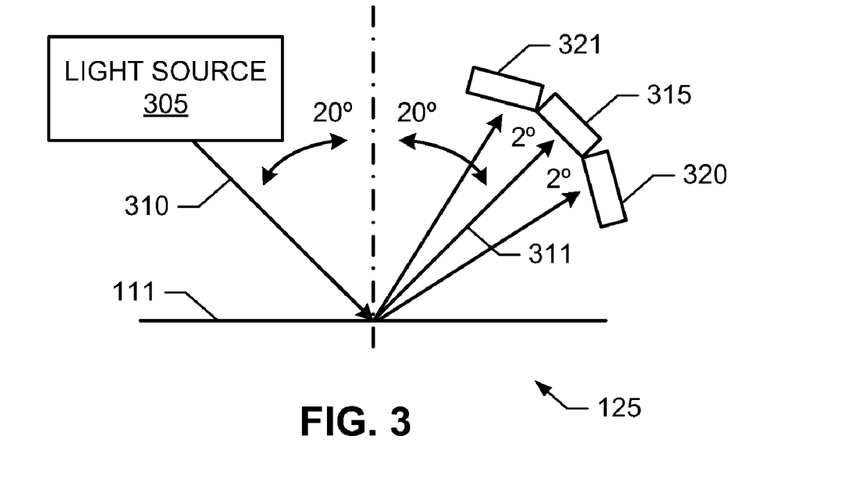
FIG. 3 illustrates an example manner of implementing the example scan module of FIG. 1.

To measure light reflectances, the example printer 100 of FIG. 1 includes a scan module 125 and a reflection measurements database 130. The example scan module 125 of FIG. 1 measures the amount of light reflected by each portion 205-207 (FIG. 2) of the gloss quality control test image 111 and stores the measured light reflectances in the example reflection measurements database 130. As shown in FIG. 3, the example scan module 125 includes one or more light sources 305 that direct light 310 toward the test image 111. In some examples, the light source(s) 305 are positioned to illuminate the test image 111 at angle of 20 degrees from perpendicular. The light source(s) 305 may have fixed locations within the printer 100 and/or be moved or scanned to sequentially illuminate the portions 205-207. In some examples, the example sensor 125 includes an array of light sources 305 to enable simultaneous measurement of light reflectances at different locations across the width of the media 110 as the media 110 passes through the printer 100. For instance, light sources 305 could be positioned within the printer 100 at locations spaced across a media feed path of the printer, with the locations corresponding to the columns of the portions 205-207.

The gloss quality of a portion 205-207 can be determined by measuring the amount of light reflected at different angles. In the illustrated example of FIG. 3, the light 310 impinges on the test image 111 at an angle of 20 degrees from perpendicular. Accordingly, a sensor 315 that is placed opposite the light source 305 and at an angle of 20 degrees from perpendicular, as depicted in FIG. 3, will measure the shininess or gloss of an illuminated portion 205-207 of the test image 111. In other words, the sensor 315 measures the amount of reflected specular light 311. As used herein, a specular reflection or reflected specular light 311 refers to the mirror-like reflection of light by a surface (i.e., the test image 111), in which light from a single incoming direction is reflected into a single outgoing direction. The law of reflection states that the direction of the incoming light 310 and the direction of the outgoing light 311 will have the same angle with the respect to the normal of the surface.

Because the test image 111 may not be completely or substantially mirror-like, some of the light 310 will be scattered. The amount of the light 311 that is scattered compared to the amount of specular light 311 represents haze, which represents a degradation of the gloss quality of test image 111. Additional sensors 320 and 321 placed on either side of the example sensor 315 measure the amount of scattered light or haze. As used herein, haze refers to the non-specular light reflected by the surface of the test image 111. In the illustrated example of FIG. 3, the sensors 320 and 321 are spaced two degrees apart from the sensor 315. While an example arrangement of the light source(s) 305 and the sensors 315, 320 and 321 is shown in FIG. 3, other arrangements may be implemented. For example, a scan module configured to directly measure blurriness or distinctness of the image (DOI) may be used. Additionally or alternatively, the light source 305 and the sensors 315, 320 and 321 may be placed at different angles with respect to the normal of the surface. Also, angular separations between the sensors 315, 320 and 321 of other than two degrees may be implemented. Further, one of the sensors 320 and 321 may be omitted.

In some examples, the scan module 125 of FIGS. 1 and 3 measures the light reflectances as the print engine 105 prints the test image 111. In other words, while the print engine 105 is printing a portion of the test image 111, the scan module 125 can measure light reflectances for a previously printed portion of the test image 111. In other examples, the print engine 105 prints the test image 111 and the test image 111 is allowed to dry. When the printer 100 and/or the scan module 125 determines that the test image 111 should be dry, a media feed module (not shown) of the printer 100 can move the test image 111 past the scan module 125. For example, the feed module could move the media 110 back into the printer 100 and then move the media 110 back out of the printer 100 as the scan module 125 measures the light reflectances. Additionally or alternatively, a user of the printer could remove the media 110 from the printer 100 and insert the media 110 with the test image 111 imprinted thereon back into the printer 100 (e.g., into a media tray, into a media input slot, etc.) to be scanned by the scan module 125.

Figure 4:
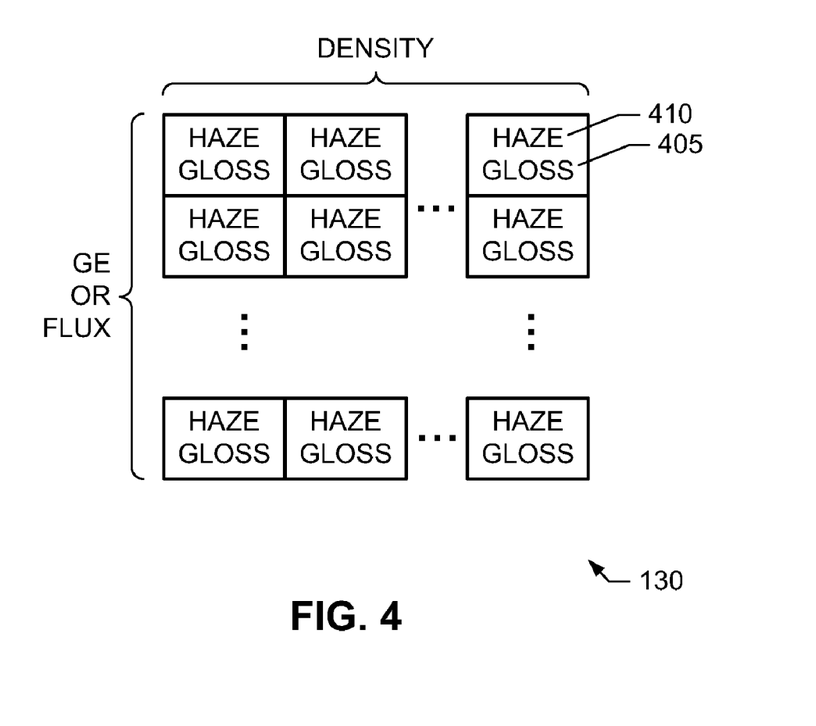
FIG. 4 illustrates an example data structure that may be used to implement the example reflection measurement database of FIG. 1.

The example sensor module 125 of FIGS. 1 and 3 measures the gloss and haze for each of the portions 205-207 of the test image 111 and stores the measurements in the example reflections measurement database 130. FIG. 4 shows an example data structure that may be used to store or represent measured light reflectances as gloss values 405 and haze values 410. In the example data structure of FIG. 4, a gloss value 405 and a haze value 410 are measured for each print parameter combination (i.e., for each portion 205-207) of each sub-image 112, and are stored in a rectangularly arranged table corresponding to the layout or arrangement of the portions 205-207 within the sub-images 112. The example reflections measurement database 130 may be implemented using any number and/or type(s) of volatile and/or non-volatile memory (-ies), memory device(s) and/or storage device(s). While an example data structure is shown in FIG. 4, any number and/or type(s) of additional and/or alternative data structures may be used to implement the example reflections measurement database 130. Further, the fields and/or data illustrated in FIG. 4 may be combined, divided, re-arranged, eliminated and/or implemented in any way. Moreover, the example data structure of FIG. 4 may include fields and/or data in addition to, or instead of, those illustrated in FIG. 4, and/or may include more than one of any or all of the illustrated fields and/or data.

Returning to FIG. 1, to select and/or adjust print control parameters based on gloss and haze measurements, the example printer 100 of FIG. 1 includes the example gloss quality calibrator 135. Any number and/or type(s) of mathematical expression(s), measurement(s) and/or estimation(s) may be used to represent and/or characterize gloss quality. In general, gloss quality may be computed from combination(s) of DOI, mean gloss, gloss standard deviation, and/or any combination of coefficients that may be used to mathematically express DOI, DOI standard deviation, mean gloss and/or gloss standard deviation. Such parameters and/or mathematical expressions may be used to, for example, model the physical response(s) of print media, ink, ink flux, and/or ink density for one or more particular printing systems. An example measure and/or metric representative of gloss quality that the example gloss quality calibrator 135 of FIG. 1 may estimate, compute and/or use to control, adjust, manage and/or optimize gloss quality is blurriness or DOI. DOI is inversely proportional to the ratio of haze (e.g., the magnitude of light measured by the sensors 320 and 321) and gloss (e.g., the magnitude of light measured by the sensor 315). An example estimate of DOI may be mathematically expressed as $$DOI = 1/[0.7266(H/G) + 0.1814], \qquad \text{EQN(1)}$$

where H represents the measured haze, which is the average of the light magnitudes measured by the sensors 320 and 321, and G represents measured gloss. While the example expression of EQN (1) represents an accurate estimate of DOI, DOI may be estimated and/or computed using any other mathematical expression(s) and/or using any number and/or type(s) of additional and/or alternative measurement(s) and/or estimation(s). The example gloss quality calibrator 135 computes DOI values for each of the portions 205-207 of the example test image 111 using the mathematical expression of EQN (1). For a particular test color (e.g., a particular sub-image 112), the gloss quality calibrator 135 may compare DOI values to identify the print parameter combination resulting in the best gloss quality for that color. Those identified print parameters may be subsequently used when printing that color and/or other colors nearby in the color gamut. In some examples, when a color to be printed was not included in the example test image 111, two or more test colors near the color to be printed can be selected and their corresponding gloss control parameters used to determine the gloss control parameters for the color to be printed. For example, the gloss control parameters of the selected test colors could be interpolated to compute the gloss control parameters for the color to be printed. Thus, the gloss quality calibrator 135 may select different gloss control parameters for different colors.

Additionally or alternatively, the example gloss quality calibrator 135 of FIG. 1 may compute an aggregate or average gloss quality across or for a plurality of portions 205-207. Such aggregate gloss qualities may, for example, represent the gloss quality of a particular print parameter combination across a plurality of colors. For example, an aggregate gloss quality may be computed across the left topmost portions 205-207 of all sub-images 112 to obtain the aggregate gloss quality for the print parameter combination associated with the left topmost portions 205-207. The example gloss quality calibrator 135 may use aggregate gloss qualities to select a single or small number of gloss control parameter combinations that may be used for all or a large number of colors. An example aggregate gloss quality (AGQ) value is mathematically expressed as $$AGQ=100(-0.3460+0.2428*DOI_p-0.0068*\sigma+0.0028*\mu) \quad\quad EQN(2)$$

where $\mu$ is the mean of the measured gloss values, $\sigma$ is the standard deviation of the measured gloss values, $DOI_p$ is the mean of DOI values computed using EQN (1).

The example gloss quality calibrator 135 of FIG. 1 saves the selected print control parameter combination(s) in the example gloss control table 120. As described below in connection with FIG. 10, the example print engine 105 uses the gloss control table 120 together with color map 115 to control the gloss quality of the printed images. An example manner of implementing the example gloss quality calibrator 134 is described below in connection with FIG. 6. Machine-accessible instructions that may be carried out using, for example, one or more processors to implement the example gloss quality calibrator 135 are described below in connection with FIG. 9. In some examples, the example gloss quality calibrator 135 is implemented by and/or within the printer 100. In other examples, the example gloss quality calibrator 135 is implemented by and/or within a computer communicatively coupled to the printer 100 and/or by and/or within a raster image processor (RIP) communicatively coupled to the printer 100 and/or the computer.

Figure 5:
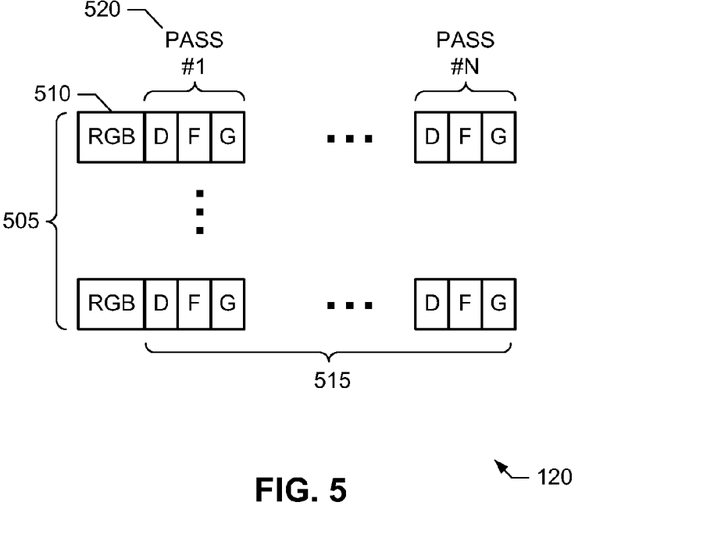
FIG. 5 illustrates an example data structure that may be used to implement the example gloss control table of FIG. 1.

FIG. 5 illustrates an example data structure that may be used to implement the example gloss control table 120 of FIG. 1. The example data structure of FIG. 5 includes a plurality of entries 505 for respective ones of a plurality of colors. To identify a color, each of the example entries 505 of FIG. 5 includes a color identifier field 510. Each of the example color identifier fields 510 of FIG. 5 contains an RGB triplet corresponding to a particular color. While RGB triplets are used in the example of FIG. 5 and to obtain information from the example color map 115, any number and/or type(s) of alternative color identifiers could be used.

To store the print control parameters (e.g., gloss control parameters) determined by the gloss quality calibrator 135), each of the example entries 505 of FIG. 5 includes a plurality of parameter fields 515. The parameter fields 515 for each entry 505 represent print control parameters for a plurality of print passes, one of which is designated at reference numeral 520. As shown in FIG. 5, each print pass 520 includes an ink density field D, an ink flux field F, and an amount of GE field G. Each of the example ink density fields D of FIG. 5 contain a value representing the amount of ink (e.g., drops or picoliters) to be applied during the pass. In some examples, the values in the ink density fields D represent percentages of a total amount of ink to be applied. Each of the example ink flux fields F of FIG. 5 contain a value representing the rate at which the amount of ink represented by the ink density field D is to be applied during the print pass. Each of the example amount of GE fields G of FIG. 5 contain a value representing the amount of GE to be applied during the print pass.

While an example data structure that may be used to implement the example gloss control table 120 of FIG. 1 is illustrated in FIG. 5, the gloss control table 120 may be implemented using any number and/or type(s) of other and/or additional fields and/or data. Further, the fields and/or data illustrated in FIG. 5 may be combined, divided, re-arranged, eliminated and/or implemented in any way. For example, only the last print pass may include the example amount of GE field G. Additionally or alternatively, the color identifier field 510 could be omitted and a single set of print parameters 515 applied to all colors. Moreover, the example data structure may include fields and/or data in addition to, or instead of, those illustrated in FIG. 5, and/or may include more than one of any or all of the illustrated fields and/or data. For example, the example data structure of FIG. 5 may be replicated for different combinations of ink type and media type to enable each ink type/media type combination to have its own set(s) of gloss control parameters.

Returning to FIG. 1, to allow users to interact, configure and/or control the example printer 100, the example printer 100 of FIG. 1 includes the example user interface 140. Among other capabilities, the example user interface 140 may enable a user to specify, for example, a thoroughness of gloss quality calibration (e.g., high, medium or low), to specify which or how many colors to be tested, an amount of ink that may be used during gloss quality calibration, how many sets of gloss quality control parameters are to selected, whether gloss quality calibration results for previous media type and/or ink type combinations are to be saved and/or discarded, etc. In some examples, the user interface 140 is implemented in conjunction with a printer driver that a user may access via a computer communicatively coupled to the printer 100. Additionally or alternatively, the user interface 140 is implemented in conjunction with a display and/or buttons implemented by the printer 100.

While an example printer 100 has been illustrated in FIGS. 1-5 one or more of the interfaces, data structures, elements, processes and/or devices illustrated in FIGS. 1-5 may be combined, divided, re-arranged, omitted, eliminated and/or implemented in any other way. For example, the scan module 125, the reflection measurements 130 and/or the gloss quality calibrator 135 may be implemented separately from or external to the printer 100. Further, the example print engine 105, the example color map 115, the example gloss control table 120, the example scan module 125, the example reflection measurements database 130, the example gloss quality calibrator 135, the example user interface 140, the example print parameter combinations database 145 and/or, more generally, the example printer 100 of FIGS. 1-5 may be implemented by hardware, software, firmware and/or any combination of hardware, software and/or firmware. Thus, for example, any of the example print engine 105, the example color map 115, the example gloss control table 120, the example scan module 125, the example reflection measurements database 130, the example gloss quality calibrator 135, the example user interface 140, the example print parameter combinations database 145 and/or, more generally, the example printer 100 may be implemented by the example process platform P100 of FIG. 11 and/or one or more circuit(s), programmable processor(s), application-specific integrated circuit(s) (ASIC(s)), programmable logic device(s) (PLD(s)), field-programmable logic device(s) (FPLD(s)), and/or field-programmable gate array(s) (FPGA(s)), etc. When any apparatus claim of this patent incorporating one or more of these elements is read to cover a purely software and/or firmware implementation, at least one of the example print engine 105, the example color map 115, the example gloss control table 120, the example scan module 125, the example reflection measurements database 130, the example gloss quality calibrator 135, the example user interface 140, the example print parameter combinations database 145 and/or, more generally, the example printer 100 is hereby expressly defined to include a tangible article of manufacture such as a tangible computer-readable medium storing the firmware and/or software. As used herein, the term tangible computer-readable medium is expressly defined to include any type of computer-readable medium and to exclude propagating signals. Example tangible computer-readable medium include a volatile and/or non-volatile memory, a volatile and/or non-volatile memory device, a compact disc (CD), a digital versatile disc (DVD), a floppy disk, a read-only memory (ROM), a random-access memory (RAM), a programmable ROM (PROM), an electronically-programmable ROM (EPROM), an electronically-erasable PROM (EEPROM), an optical storage disk, an optical storage device, magnetic storage disk, and/or a magnetic storage device, a cache, or any other storage media in which information is stored for any duration (e.g., for extended time periods, permanently, brief instances, for temporarily buffering, and/or for caching of the information) and which can be accessed by a processor, a computer and/or other machine having a processor, such as the example processor platform P100 discussed below in connection with FIG. 11. As used herein, the term non-transitory computer-readable medium is expressly defined to include any type of computer-readable medium and to exclude propagating signals. Further still, the example printer 100 may include interfaces, data structures, elements, processes and/or devices instead of, or in addition to, those illustrated in FIGS. 1-5 and/or may include more than one of any or all of the illustrated interfaces, data structures, elements, processes and/or devices.

Figure 6:
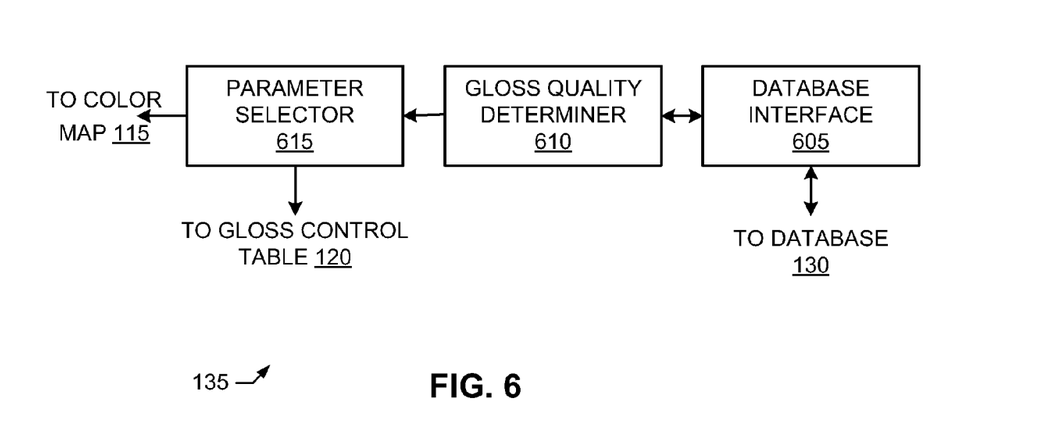
FIG. 6 illustrates an example manner of implementing the example gloss quality calibrator of FIG. 1.

FIG. 6 illustrates an example manner of implementing the example gloss quality calibrator 135 of FIG. 1. To obtain light reflectances measured by the example scan module 125 of FIG. 1, the example gloss quality calibrator 135 of FIG. 6 includes a database interface 605. Using any number and/or type(s) of message(s), application programming interface(s) and/or protocol(s), the example database interface 605 of FIG. 6 queries the example measurements database 130 to obtain haze and gloss values measured for particular printer parameter combinations and/or for particular colors.

To compute, estimate and/or determine gloss quality for one or more combinations of color and/or print parameter combination, the example gloss quality calibrator 135 of FIG. 6 includes a gloss quality determiner 610. Using, for example, the mathematical expressions of EQN (1) and/or EQN (2) and the haze and gloss values retrieved via the database interface 605, the example gloss quality determiner 610 of FIG. 6 computes values representative of gloss quality.

To select gloss control parameters, the example gloss quality calibrator 135 of FIG. 6 includes a parameter selector 615. The example parameter selector 615 of FIG. 6 identifies the print parameter combination(s) resulting in the highest gloss quality, and stores the corresponding print parameter combination(s) in the example gloss control table 120, as described above in connection with FIG. 5. As discussed above, the parameter selector 615 may select more than one print parameter combination depending on whether different colors may use different gloss control settings or whether a common set of gloss control settings are to be used for multiple or all colors. For example, the parameter combination with the best gloss quality may be identified by comparing the outputs of the gloss quality determiner 610 for corresponding colors. As described below in connection with FIGS. 7 and 8, in some examples, the parameter selector 615 of FIG. 6 generates a combined gloss control and color map table based on color map information contained in the color map 115 and gloss qualities computed by the example gloss quality determiner 610.

While an example manner of implementing the example gloss quality calibrator 135 of FIG. 1 has been illustrated in FIG. 6 one or more of the interfaces, data structures, elements, processes and/or devices illustrated in FIG. 6 may be combined, divided, re-arranged, omitted, eliminated and/or implemented in any other way. Further, the example database interface 605, the example gloss quality determiner 610, the example parameter selector 615 and/or, more generally, the example gloss quality calibrator 135 of FIG. 6 may be implemented by hardware, software, firmware and/or any combination of hardware, software and/or firmware. Thus, for example, any of the example database interface 605, the example gloss quality determiner 610, the example parameter selector 615 and/or, more generally, the example gloss quality calibrator 135 may be implemented by the example process platform P100 of FIG. 11 and/or one or more circuit(s), programmable processor(s), ASIC(s), PLD(s), FPLD(s), and/or FPGA(s), etc. When any apparatus claim of this patent incorporating one or more of these elements is read to cover a purely software and/or firmware implementation, at least one of the example database interface 605, the example gloss quality determiner 610, the example parameter selector 615 and/or, more generally, the example gloss quality calibrator 135 are hereby expressly defined to include a tangible article of manufacture such as a tangible computer-readable medium storing the firmware and/or software. Further still, the example gloss quality calibrator 135 may include interfaces, data structures, elements, processes and/or devices instead of, or in addition to, those illustrated in FIG. 6 and/or may include more than one of any or all of the illustrated interfaces, data structures, elements, processes and/or devices.

Figure 7:
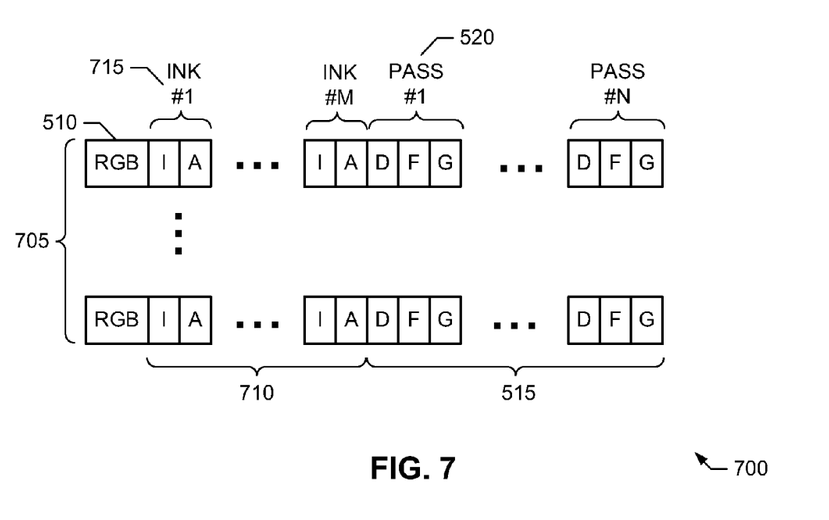
FIGS. 7 and 8 illustrate example data structures that may be used to implement a combined color map and gloss control table.
Figure 8:
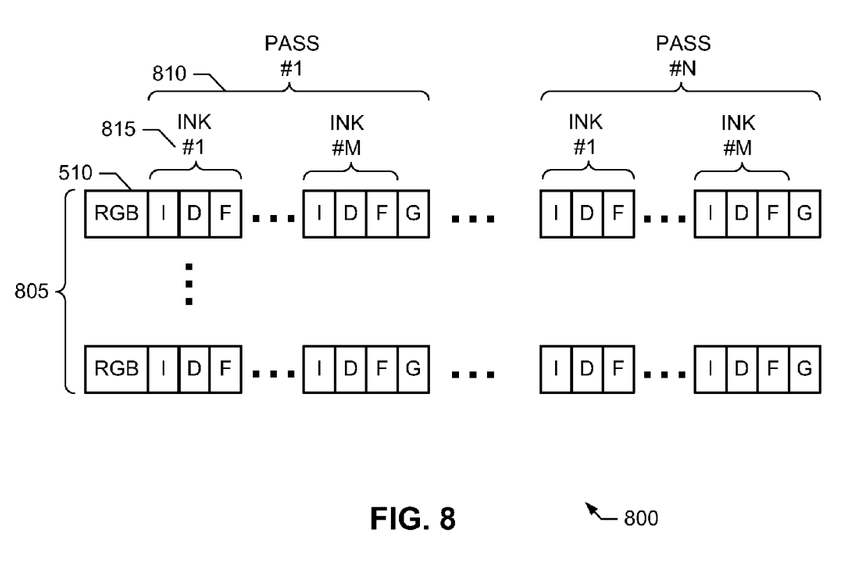

FIGS. 7 and 8 illustrate example data structures 700 and 800, respectively, that may be generated by the example quality control calibrator 135 to represent a combined color map and gloss control table. The example data structure 700 of FIG. 7 includes a plurality of entries 705 for respective ones of a plurality of colors. In the illustrated example of FIG. 7, color map information 710 is inserted between the example color identifier fields 510 and the example print parameters 515 described above in connection with FIG. 5. Accordingly, the example data structure 700 represents a concatenation of color map information and gloss control information allowing the print engine 105 to obtain color and gloss control information via a single query of the data structure 700.

The color map fields 710 for each example entry 705 of FIG. 7 represents a plurality of inks to be mixed and/or applied to a achieve a particular color. Accordingly, the color map fields 710 are split into sets, one of which is designated at reference 715, corresponding to different ink colors. As shown in FIG. 7, each set of information 715 includes an ink identifier field I, and an ink amount field A. Each of the example ink identifier fields I of FIG. 7 contains a value and/or symbol that uniquely represents and/or identifies one of a plurality of inks that may be used by the printer 100. Each of the example ink amount fields A of FIG. 7 contains a value that represents an amount (e.g., drops, picoliters, etc.) of the corresponding ink I to be applied to obtain the associated color 510.

To use the example data structure 700 of FIG. 7 to print a particular color, the example print engine 105 identifies the entry 705 (i.e., row) of the data structure 700 corresponding to that color by comparing the color's RGB identifier to the color identifier fields 510. The print engine 105 reads and/or obtains from the identified entry 705 the amounts of each color ink from the color map fields 710 and allocates the ink to the different printing passes according to the ink density fields D. The allocated amounts of each ink are then applied during each pass at the rate specified in the ink flux fields F to achieve the ink mixture required to achieve the desired print color and to achieve the desired gloss quality.

Compared to the example of FIG. 7, in the example data structure 800 of FIG. 8, the amounts of each ink color required to achieve a desired color have been pre-allocated to printing passes according to selected gloss control parameters. The example data structure 800 of FIG. 8 includes a plurality of entries 805 for respective ones of a plurality of colors. To identify a color, each of the example entries 805 of FIG. 8 includes the example color identifier field 510 described above in connection with FIG. 5.

Each of the example entries 805 of FIG. 8 includes control information for each of a plurality of print passes, one of which is designated at reference numeral 810. As shown in FIG. 8, each set of the example control information 810 includes print control information for each of a plurality of inks, one of which is designated at reference numeral 815. Each set of the example print control information 815 of FIG. 8 includes the example ink identifier field I, the example ink density field D, and the example ink flux field F described above in connection with FIGS. 5 and 7.

To use the example data structure 800 of FIG. 8 to print a particular color, the example print engine 105 identifies the entry 805 (e.g., row) of the data structure 800 corresponding to that color by comparing the color's RGB identifier to the color identifier fields 510. For each printing pass 810, the print engine 105 reads and/or obtains from the identified entry 805 the print control information 815 for each color ink. The print engine 105 applies the ink(s) according to the ink density fields D and the ink flux fields F.

Even though only a representative subset of the printer's gamut or colors may have been included in the test image 111, the example data structures 700 and 800 could contain entries 705 and 805, respectively, for each color in the printer's gamut. That is, while the data structures 700 and 800 are being populated and/or computed, gloss control parameters selected for the various test colors may be interpolated to determine gloss control parameters for untested colors. By pre-populating comprehensive data structures 700 and 800, the computational burden on the print engine 105 during printing may be reduced. The data structures 700 and 800 could also be pre-populated via, for example, a firmware upgrade.

While example data structures 700 and 800 that may be used to implement a combined color map and gloss control table are illustrated in FIGS. 7 and 8, respectively, a print control table may be implemented using any number and/or type(s) of other and/or additional fields and/or data. Further, the fields and/or data illustrated in FIGS. 7 and 8 may be combined, divided, re-arranged, eliminated and/or implemented in any way. For example, only the last print pass may include the amount of GE field G and/or each ink applied during a printing pass may be applied using the same ink flux. Moreover, the example data structures 700 and 800 may include fields and/or data in addition to, or instead of, those illustrated in FIGS. 7 and 8, and/or may include more than one of any or all of the illustrated fields and/or data. For example, the example data structures 700 and 800 of FIGS. 7 and 8 may be replicated for different combinations of ink type and media type to enable each ink type/media type combination to have its own set(s) of color and gloss control parameters.

Figure 9:
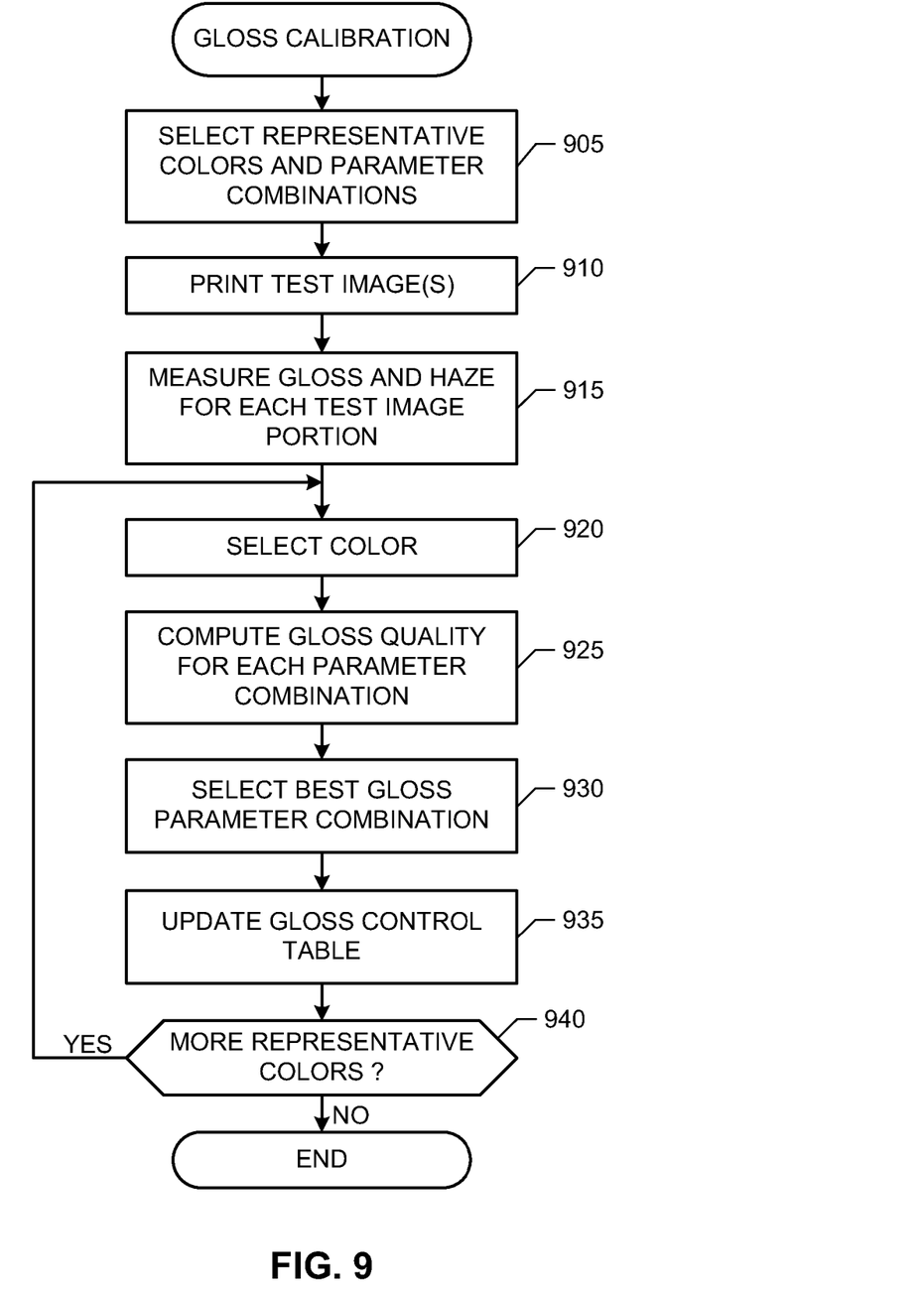
FIG. 9 is representative of example machine-accessible instructions that may be executed by, for example, one or more processors, to control the gloss quality of the example printer of FIG. 1.
Figure 10:
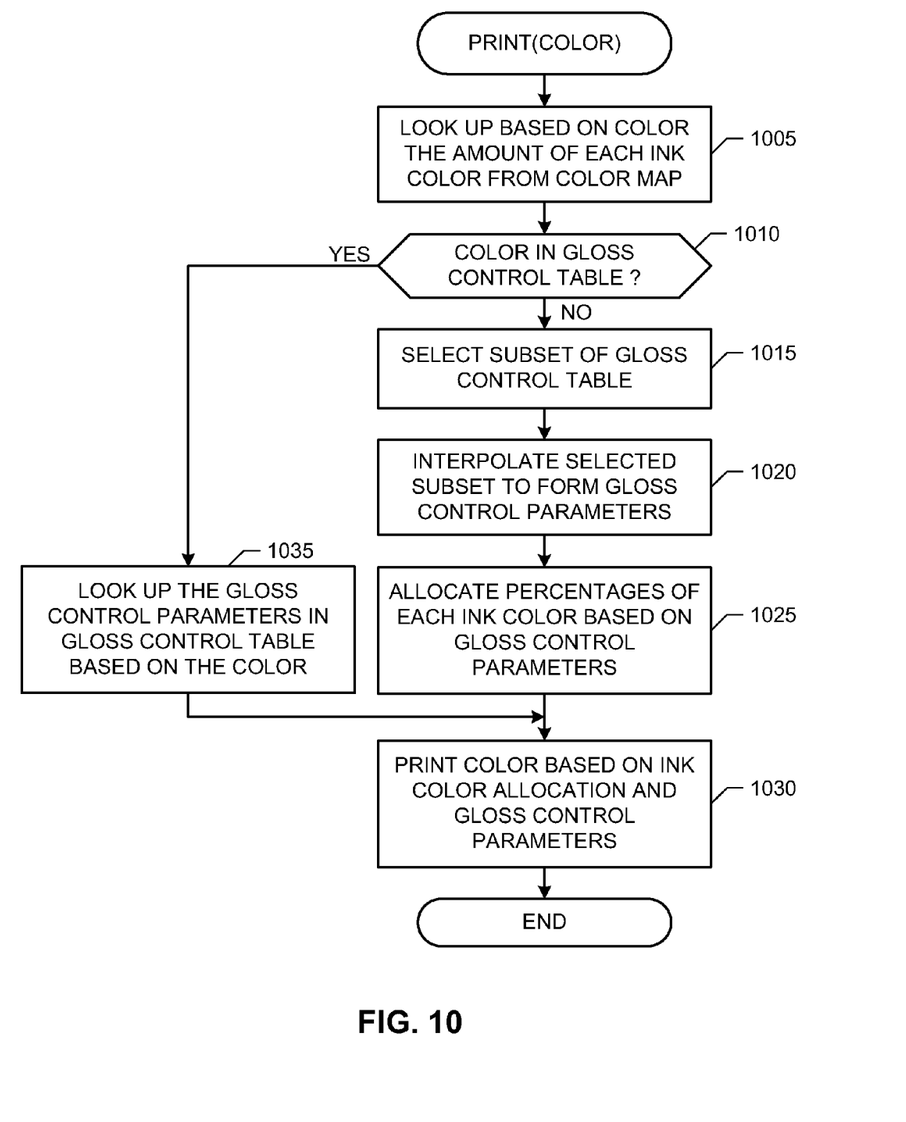
FIG. 10 is representative of example machine-accessible instructions that may be executed by, for example, one or more processors, to implement the example print engine of the example printer of FIG. 1.

FIG. 9 illustrates illustrate example machine-accessible instructions that may be executed to implement the example gloss quality calibrator 135 of FIGS. 1 and 6 or to control the gloss quality of printed images. FIG. 10 illustrates example machine-accessible instructions that may be executed to implement the example print engine 105 of FIG. 1. A processor, a controller and/or any other suitable processing device may be used, configured and/or programmed to execute the example machine-accessible instructions of FIGS. 9 and/or 10. For example, the machine-accessible instructions of FIGS. 9 and/or 10 may be embodied in coded instructions stored on a tangible computer-readable medium. Machine-readable instructions comprise, for example, instructions and data that cause a processor, a computer and/or a machine have a processor to perform one or more particular processes. Alternatively, some or all of the example machine-accessible instructions of FIGS. 9 and/or 10 may be implemented using any combination(s) of ASIC(s), PLD(s), FPLD(s), FPGA(s), discrete logic, hardware, firmware, etc. Also, some or all of the example process of FIGS. 9 and/or 10 may be implemented manually or as any combination of any of the foregoing techniques, for example, any combination of firmware, software, discrete logic and/or hardware. Further, many other methods of implementing the example operations of FIGS. 9 and/or 10 may be employed. For example, the order of execution of the blocks may be changed, and/or one or more of the blocks described may be changed, eliminated, sub-divided, or combined. Additionally, any or all of the example machine-accessible instructions of FIGS. 9 and/or 10 may be carried out sequentially and/or carried out in parallel by, for example, separate processing threads, processors, devices, discrete logic, circuits, etc.

The example machine-accessible instructions of FIG. 9 allow each tested color to result in the selection of different gloss control parameters. However, based on the descriptions presented above in connection with FIGS. 1-5, it should be apparent how the example machine-accessible instructions of FIG. 9 could be modified to select a set of gloss control parameters applicable for more than one color. The example machine-accessible instructions of FIG. 9 begin with the selection of a set of colors and print parameter combinations to be tested (block 905). As described above, the set of representative colors and print parameters combinations may be pre-determined and stored in the combinations database 145, dynamically determined by the gloss quality calibrator 135 and/or received from a user via the example user interface 140.

The example print engine 105 prints the gloss quality test image 111 based on the selected set of test colors and print parameter combinations (block 910). The example scan module 125 measure the gloss and haze of each sub-image portion 205-207 of the test image 111 (block 915). In some examples, the scan module 125 may be calibrated prior to measuring the gloss and haze of each of the sub-image portions 205-207. For example, the scan module 125 may be calibrated by setting a baseline white point on the media 110 across the test area, and/or in conjunction with some known test pattern that is inserted into the printer 100 and used the calibrate the scan module 125 and/or the printer 100. The calibration could be done either in the field and/or at the factory.

Starting with a first test color (block 920), the example gloss quality determiner 610 computes the DOI for each portion 205-207 associated with the first test color using, for example, EQN (1) (block 925). The example parameter selector 615 compares the computed DOI values to identify the print parameter combination resulting in a preferred gloss quality (block 930). The example parameter selector 615 stores the selected print parameter combination in the gloss control table 115 (block 935). Additionally or alternatively, the parameter selector 615 updates a combined color map and gloss control table such as the example data structure 800 of FIG. 8.

If there are more test colors to analyze (block 940), control returns to block 920 to select the next test color. If there are no more test colors to analyze (block 940), control exits from the example machine-accessible instructions of FIG. 9.

The example machine-accessible instructions of FIG. 10 may be executed to implement the example print engine 105 of FIG. 1. The example machine-accessible instructions of FIG. 10 begin when the example print engine 105 receives a command or instruction, or determines that an identified color is to be printed. The example print engine 105 queries the example color map 115 to determine the quantities of each ink to achieve the identified color (block 1005). If the identified color is not represented in the gloss control table 120 (FIG. 5) (block 1010), the print engine 105 identifies one or more test colors that are near the identified color in the printer's color gamut (block 1015). The gloss control parameters 515 for the identified test colors are interpolated to obtain or compute for each print pass the gloss control parameters (D, F and G) for the identified color (block 1020). The quantities of ink obtained at block 1005 are allocated to the print passes based on the computed ink density values D (block 1025). The print engine 105 prints the allocated ink amounts based on the computed ink flux F values and amounts of GE G values (block 1030). Control then exits from the example machine-accessible instructions of FIG. 10.

Returning to block 1010, if the identified color is represented in the gloss control table 120 (block 1010), the print engine 105 queries the gloss control table 120 to obtain the gloss control parameters associated with the identified color (block 1035). Control proceeds to block 1030 to print the identified color.

Figure 11:
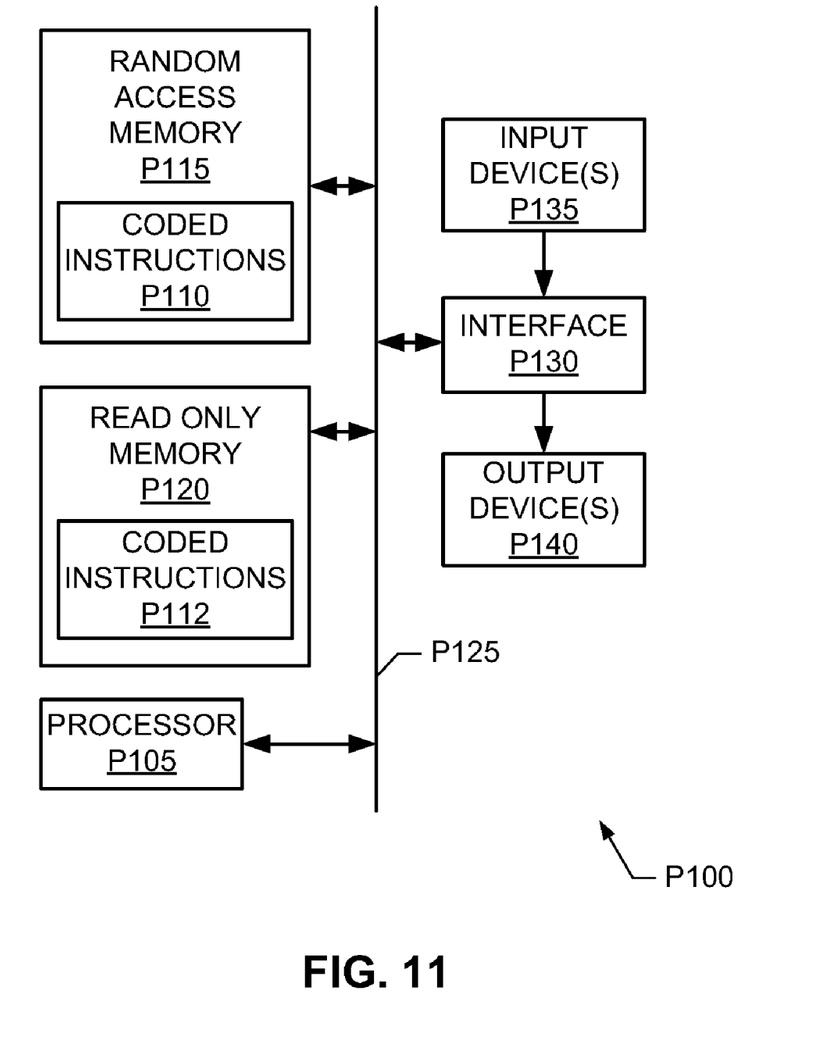
FIG. 11 is a schematic illustration of an example processor platform that may be used and/or programmed to execute the example machine-accessible instructions of FIGS. 9 and 10 to control the gloss quality of a printer.

FIG. 11 is a schematic diagram of an example processor platform P100 that may be used and/or programmed to execute the machine readable instructions represented by FIGS. 9 and/or 10 and/or to implement the example printers 100, the example gloss quality calibrators 135 and/or the example print engines 105 described herein. One or more general-purpose processors, processor cores, microcontrollers, etc may be used to implement the processor platform P100.

The processor platform P100 of the example of FIG. 11 includes at least one programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine-accessible instructions of FIGS. 9 and 10 to control gloss quality of a printed image as described herein. Thus, the coded instructions P110, P112 may include the instructions of FIGS. 9 and/or 10.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller. The example memory P115 may be used to, for example, implement the example color map 115, the example gloss control table 120, the example reflections measurement database 130, the example print parameter combinations database 145 of FIG. 1 and/or the example data structures of FIGS. 5, 7 and 8.

The processor platform P100 also includes an interface circuit P130. Any type of interface standard, such as an external memory interface, serial port, general-purpose input/output, etc, may implement the interface circuit P130. One or more input devices P135 and one or more output devices P140 are connected to the interface circuit P130. The example input and output devices P135 and P140 may be used, for example, to implement the example scan module 125 of FIG. 1.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent either literally or under the doctrine of equivalents.

What is claimed is:

1. An apparatus to control gloss quality, comprising:
a print engine to print a plurality of images for respective ones of a plurality of colors, each image representing a plurality of different print parameter combinations;
a scan module to measure a first plurality of light reflectances for respective ones of the plurality of images and the print parameter combinations; and
a calibrator to calibrate an operation of the print engine for respective ones of the plurality of colors based on the first plurality of measured light reflectances, the operations of the print engine including at least one of an order of ink application, a rate of ink application, a density of ink application, or an applied amount of gloss enhancer.

2. An apparatus as defined in claim 1, wherein the calibrator comprises:
a database interface to obtain the measured light reflectances from the scan module;
a gloss quality determiner to compute a plurality of values representative of gloss qualities for respective ones of the print parameter combinations; and
a parameter selector to select parameters associated with the operation of the print engine based on the computed plurality of values.

3. An apparatus as defined in claim 1, wherein the at least one of the order of ink application, the rate of ink application, the density of ink application, or the applied amount of gloss enhancer is for a first printing pass of the print engine, and the operation of the print engine includes at least one of a second order of ink application, a second rate of ink application, a second density of ink application, or a second applied amount of gloss enhancer for a second printing pass of the print engine.

4. An apparatus as defined in claim 1, wherein the scan module comprises a first sensor to measure the first plurality of light reflectances and a second sensor to measure a second plurality of light reflectances for the respective ones of the plurality of images and the print parameter combinations, and the calibrator is to calibrate the operation of the print engine based on the first and second measured light reflectances, the first plurality of light reflectances representing glosses and the second plurality of light reflectances representing hazes.

5. An apparatus as defined in claim 1, further comprising a user interface to enable a person to at least one of select the plurality of colors or select the plurality of print parameter combinations.

6. An apparatus as defined in claim 1, wherein the plurality of print parameters comprises a media type.

7. An apparatus as defined in claim 1, wherein the print engine is to print a color of another image by querying a color map based on an identifier corresponding to the color to identify a plurality of amounts of ink for respective ones of a plurality of ink colors, and applying the amounts of ink based on the calibrated operation of the print engine.

8. An apparatus as defined in claim 1, wherein the print engine is to interpolate between a first calibrated operation of the print engine and a second calibrated operation of the print engine when a color to be printed does not correspond to one of the plurality of colors.

9. An apparatus as defined in claim 1, wherein the calibrator is to store the calibrated operation of the print engine in a gloss control database, the gloss control database including a plurality of entries for respective ones of the plurality of colors.

10. A method to control gloss quality, comprising:
printing a plurality of images for respective ones of a plurality of colors, each image representing a plurality of different print parameter combinations;
measuring a first plurality of light reflectances for respective ones of the colors and the print parameter combinations; and
calibrating an operation of a print engine for respective ones of the colors based on the first plurality of measured light reflectances, the operation of the print engine including at least one of an order of ink application, a rate of ink application, a density of ink application, or an applied amount of gloss enhancer.

11. A method as defined in claim 10, further comprising:
querying a color map based on an identifier corresponding to a color to be printed to identify a plurality of amounts of ink for respective ones of a plurality of ink colors; and
applying the amounts of ink based on the calibrated operation of the print engine.

12. A method as defined in claim 10, further comprising interpolating between a first calibrated operation of the print engine and a second calibrated operation of the print engine when a color to be printed does not correspond to one of the plurality of colors.

13. A tangible article of manufacture storing machine-readable instructions that, when executed, cause a machine to control gloss quality by at least:
measuring a first plurality of light reflectances for respective ones of a plurality of portions of a plurality of subimages printed for respective ones of a plurality of colors, the subimages including the plurality of portions for respective ones of a plurality of print parameter combinations; and
calibrating a plurality of operations of a print engine for respective ones of the plurality of colors based on the first plurality of measured light reflectances, the operations of the print engine including at least one of an order of ink application, a rate of ink application, a density of ink application, or an applied amount of gloss enhancer.

14. A tangible article of manufacture as defined in claim 13, wherein the machine-readable instructions, when executed, cause the machine to query a color map based on an identifier corresponding to a color to be printed to identify a plurality of amounts of ink for respective ones of a plurality of ink colors; and
apply the amounts of ink based on the calibrated plurality of operations of the print engine.

15. A tangible article of manufacture as defined in claim 13, wherein the machine-readable instructions, when executed, cause the machine to interpolate between a first calibrated operation of the print engine and a second calibrated operation of the print engine when a color to be printed does not correspond to one of the plurality of colors.

* * * * *